US012046385B2

(12) United States Patent
Kajishiro et al.

(10) Patent No.: US 12,046,385 B2
(45) Date of Patent: Jul. 23, 2024

(54) PRODUCTION METHOD OF 226Ra TARGET, PRODUCTION METHOD OF 225Ac, AND ELECTRODEPOSITION SOLUTION FOR PRODUCING 226Ra TARGET

(71) Applicant: NIHON MEDI-PHYSICS CO., LTD., Tokyo (JP)

(72) Inventors: Ikuo Kajishiro, Tokyo (JP); Shinya Yano, Tokyo (JP); Jun Ichinose, Tokyo (JP)

(73) Assignee: NIHON MEDI-PHYSICS CO., LTD., Tokyo (JP)

( * ) Notice: Subject to any disclaimer, the term of this patent is extended or adjusted under 35 U.S.C. 154(b) by 0 days.

(21) Appl. No.: 17/619,275

(22) PCT Filed: Jun. 18, 2020

(86) PCT No.: PCT/JP2020/023971

§ 371 (c)(1),
(2) Date: Dec. 15, 2021

(87) PCT Pub. No.: WO2020/256066

PCT Pub. Date: Dec. 24, 2020

(65) Prior Publication Data

US 2022/0356591 A1 Nov. 10, 2022

(30) Foreign Application Priority Data

Jun. 19, 2019 (JP) ................................ 2019-113698

(51) Int. Cl.

| | |
|---|---|
| ***C25D 3/54*** | (2006.01) |
| ***C25D 5/48*** | (2006.01) |
| ***G21G 1/00*** | (2006.01) |
| ***G21G 1/06*** | (2006.01) |
| ***G21G 1/10*** | (2006.01) |
| ***G21G 1/12*** | (2006.01) |
| *G21G 1/04* | (2006.01) |

(52) U.S. Cl.

CPC ............... *G21G 1/001* (2013.01); *C25D 3/54* (2013.01); *G21G 1/06* (2013.01); *G21G 1/10* (2013.01); *G21G 1/12* (2013.01); *G21G 2001/0089* (2013.01); *G21G 1/04* (2013.01)

(58) Field of Classification Search

CPC .................................. C25D 3/54; C25D 5/48
USPC ................................................ 205/261, 220
See application file for complete search history.

(56) References Cited

U.S. PATENT DOCUMENTS

| | | | | |
|---|---|---|---|---|
| 6,299,666 B1 * | 10/2001 | Apostolidis | G21G 1/10 376/125 |
| 2002/0094056 A1 | 7/2002 | Satz et al. | |
| 2007/0153954 A1 | 7/2007 | Harfensteller et al. | |
| 2009/0191122 A1 | 7/2009 | Moreno et al. | |
| 2010/0044587 A1 | 2/2010 | Bedeschi | |
| 2010/0189642 A1 | 7/2010 | Morgenstern et al. | |
| 2018/0047474 A1 | 2/2018 | O'hara | |

FOREIGN PATENT DOCUMENTS

| | | | | |
|---|---|---|---|---|
| JP | 2007-508531 A | 4/2007 | |
| JP | 2007-536533 A | 12/2007 | |
| JP | 2009-527731 A | 7/2009 | |
| JP | 2010-502965 A | 1/2010 | |
| KR | 10-2018-0105287 A | 9/2018 | |
| WO | WO-2005039647 A2 * | 5/2005 | A61K 51/1282 |
| WO | 2017157355 A1 | 9/2017 | |
| WO | WO-2017157355 A1 * | 9/2017 | C22B 3/42 |

OTHER PUBLICATIONS

Hamilton et al., "Radium Isotope Determination by Alpha-Spectrometry After Electrodeposition from Solution with Added Platinum," Journal of Radioanalytical and Nuclear C Chemistry (Jan. 17, 1994), vol. 177, No. 2, pp. 365-371. (Year: 1994).*
Alvarado et al., "Rapid Determination of Radium Isotopes by Alpha Spectrometry," Journal of Radioanalytical and Nuclear Chemistry (Jul. 17, 1995), vol. 194, No. 1, pp. 163-172. (Year: 1995).*
Garcia-Tenorio et al., "226Ra Determination by Electrodeposition," Science of the Total Environment (Feb. 1, 1988), vol. 69, pp. 225-238. (Year: 1988).*
Ganzerli et al., "Use of Inorganic Adsorbers in Radium Analysis," Journal of Radioanalytical and Nuclear Chemistry (Mar. 17, 1998), vol. 229, Nos. 1-2, pp. 39-41. (Year: 1998).*
Extended European Search Report issued on May 19, 2022, by the European Patent Office in corresponding European Application No. 20827092.6. (8 pages).
Office Action (Notice of Reasons for Refusal) issued on Jul. 19, 2022, by the Japanese Patent Office in corresponding Japanese Patent Application No. 2021-526877, and an English translation of the Office Action. (7 pages).
Office Action (Request for the Submission of an Opinion) issued on Jul. 7, 2022, by the Korean Intellectual Property Office in corresponding Korean Patent Application No. 10-2021-7040932, and an English translation of the Office Action. (8 pages).
Lee, S. C. et al., "Electrodeposition of selected alpha-emitting nuclides from ammonium acetate electrolyte", Journal of Alloys and Compounds, vol. 213-214, 1994, pp. 465-466.
Garcia-Tenorio, R. et al., "226Ra Determination by electrodeposition", The Science of the Total Environment, vol. 69, 1988, pp. 225-238.
Office Action issued on Oct. 3, 2022, by the U.S. Patent and Trademark Office in U.S. Appl. No. 17/847,526, U.S. Patent and Trademark Office, Alexandria, VA. (16 pages).

(Continued)

*Primary Examiner* — Edna Wong
(74) *Attorney, Agent, or Firm* — Panitch Schwarze Belisario & Nadel LLP

(57) ABSTRACT

One embodiment of the present invention relates to a production method of a $^{226}$Ra target, a production method of $^{225}$Ac, or an electrodeposition solution for producing a $^{226}$Ra target, and the production method of a $^{226}$Ra target includes an electrodeposition step of electrodepositing a $^{226}$Ra-containing substance on a substrate by using an electrodeposition solution that contains $^{226}$Ra ions and a pH buffer.

13 Claims, No Drawings

(56) References Cited

OTHER PUBLICATIONS

Office Action (Request for Submission of an Opinion) issued on Oct. 12, 2022, by the Korean Intellectual Property Office in corresponding Korean Patent Application No. 10-2021-7040932, and an English translation of the Office Action. (8 pages).

International Search Report (PCT/ISA/210) with an English translation issued on Sep. 8, 2020, by the Japanese Patent Office as the International Searching Authority for International Application No. PCT/JP2020/023971. (7 pages).

Written Opinion (PCT/ISA/237) with an English translation issued on Sep. 8, 2020, by the Japanese Patent Office as the International Searching Authority for International Application No. PCT/JP2020/023971. (8 pages).

Office Action issued on Apr. 10, 2023, by the U.S. Patent and Trademark Office in U.S. Appl. No. 17/847,526, U.S. Patent and Trademark Office, Alexandria, VA. (4 pages).

Notice of Allowance issued Feb. 14, 2023, by the Korean Intellectual Property Office in corresponding Korean Patent Application No. 10-2021-7040932, and an English translation of the Notice. (6 pages).

Written Opinion issued Feb. 17, 2023, by the Intellectual Property Office of Singapore in corresponding Singapore Patent Application No. 11202113917W. (5 pages).

Office Action issued on Oct. 20, 2023, by the U.S. Patent and Trademark Office in U.S. Appl. No. 17/847,526, U.S. Patent and Trademark Office, Alexandria, VA. (8 pages).

First Office Action issued on Feb. 7, 2024, by the China National Intellectual Property Administration in corresponding Chinese Patent Application No. 202080044026.X, with English translation of the Office Action (14 pages).

Office Action issued on Mar. 5, 2024, by the European Patent Office in corresponding European Patent Application No. 20827092.6 (9 pages).

Notice of Reasons for Refusal issued on Mar. 26, 2024, by the Japanese Patent Office in corresponding Japanese Patent Application No. 2022-172471, with English translation of the Notice (5 pages).

* cited by examiner

PRODUCTION METHOD OF 226Ra TARGET, PRODUCTION METHOD OF 225Ac, AND ELECTRODEPOSITION SOLUTION FOR PRODUCING 226Ra TARGET

TECHNICAL FIELD

One embodiment of the present invention relates to a production method of a $^{226}$Ra target, a production method of $^{225}$Ac, or an electrodeposition solution for producing a $^{226}$Ra target.

BACKGROUND ART $^{225}$Ac, which is one of alpha-radionuclides, is a radionuclide having a half-life of 10 days, and, in recent years, there has been a growing expectation that $^{225}$Ac will be used as a therapeutic nuclide for treating, for example, cancer.

$^{225}$Ac is produced through a (p, 2n) nuclear reaction that involves, for example, irradiating a $^{226}$Ra target with protons using an accelerator.

As a production method of such a $^{226}$Ra target, there is known a method for electrodepositing a $^{226}$Ra-containing substance on an aluminum surface by using an isopropanol-containing plating solution (see Patent Literature 1).

CITATION LIST

Patent Literature

Patent Literature 1: JP-A-2007-508531

SUMMARY OF INVENTION

However, according to existing $^{226}$Ra electrodeposition methods, the electrodeposition solution undergoes a decrease in electrical conductivity, and high voltage needs to be applied in order to electrodeposit a predetermined amount of $^{226}$Ra. This increases the size of, for example, power supplies and equipment, and a cooling step for removing generated heat may become necessary in some cases. Moreover, it has been found that despite application of high voltage, $^{226}$Ra ions contained in the electrodeposition solution cannot be efficiently deposited on a substrate.

An embodiment of the present invention provides a production method of a $^{226}$Ra target, the method capable of efficiently electrodepositing $^{226}$Ra ions contained in an electrodeposition solution on a substrate.

The present inventors have conducted extensive investigations on the method for addressing the above issues, and found that the above issues can be addressed by a particular production method, thereby completing the present invention.

One aspect of the present invention provides a production method of a $^{226}$Ra target, including an electrodeposition step of electrodepositing a $^{226}$Ra-containing substance on a substrate by using an electrodeposition solution that contains $^{226}$Ra ions and a pH buffer.

In addition, another aspect of the present invention provides a production method of $^{225}$Ac, the method including an irradiating step of irradiating a $^{226}$Ra target, which has been produced by the above production method of a $^{226}$Ra target, with at least one selected from charged a particle, a photon, and a neutron.

Furthermore, yet another aspect of the present invention provides an electrodeposition solution for producing a $^{226}$Ra target, containing $^{226}$Ra ions and a pH buffer, and the electrodeposition solution is substantially free of alcohols.

According to an embodiment of the present invention, $^{226}$Ra ions contained in the electrodeposition solution can be efficiently electrodeposited on a substrate without applying high voltage. Thus, according to an embodiment of the present invention, the size of the facility for producing $^{226}$Ra targets can be reduced, and $^{226}$Ra targets can be produced without performing a cooling step. In other words, according to one embodiment of the present invention, $^{226}$Ra targets can be produced with less space and less energy, and by a simple method.

According to an embodiment of the present invention, since a $^{226}$Ra target that contains a predetermined amount of a $^{226}$Ra-containing substance can be produced, a predetermined amount of $^{225}$Ac can be easily produced by using this target with less space and less energy.

DESCRIPTION OF EMBODIMENTS

[Production Method of $^{226}$Ra Target]

A production method of a $^{226}$Ra target according to one embodiment of the present invention (hereinafter, this method may also be referred to as a "present production method") includes an electrodeposition step of electrodepositing a $^{226}$Ra-containing substance on a substrate by using an electrodeposition solution that contains $^{226}$Ra ions and a pH buffer.

According to the present production method, the $^{226}$Ra containing substance is electrodeposited on a substrate. Examples of the $^{226}$Ra-containing substance include $^{226}$Ra metal and $^{226}$Ra salts. That is, the $^{226}$Ra target obtained through the present production method contains $^{226}$Ra metal or a $^{226}$Ra salt.

<Electrodeposition Solution>

The electrodeposition solution is not particularly limited and may be any liquid that contains $^{226}$Ra ions and a pH buffer, and may further contain components other than these, if necessary.

In view of, enhancing the effects of the present invention, the electrodeposition solution is preferably an aqueous solution. In this case, pure water or ultrapure water is preferably used.

In the present production method, although two or more electrodeposition solutions may be used, one electrodeposition solution is usually used.

In the above existing method for electrodepositing a $^{226}$Ra-containing substance, an alcohol such as isopropanol was used.

However, investigations conducted by the present inventors have found that, according to the present production method, a $^{226}$Ra-containing substance can be electrodeposited on a substrate without using an alcohol. Thus, from the viewpoints such as that the decrease in electrical conductivity of the electrodeposition solution can be suppressed and that $^{226}$Ra ions contained in the electrodeposition solution can be efficiently electrodeposited on a substrate, the electrodeposition solution is preferably substantially free of alcohols.

Examples of the alcohol include C1-C5 alkyl alcohols such as ethanol, 1-propanol, and isopropanol.

In addition, the electrodeposition solution is preferably substantially free of acetones for the same reasons as for the alcohols.

Here, the meaning of substantially free of alcohols or acetones is that alcohols or acetones are not intentionally added to the electrodeposition solution. Specifically, the alcohol or acetone content in the electrodeposition solution is preferably 0.01 mass % or less, and the lower limit of the content is 0 mass %.

From the viewpoints such as that $^{226}$Ra ions can be more efficiently electrodeposited on a substrate, the electrodeposition solution preferably contains carboxylate ions ($COO^-$) and more preferably contains acetate ions.

From the viewpoints such as that $^{226}$Ra ions can be more efficiently electrodeposited on a substrate, the electrodeposition solution is preferably acidic at the start of the electrodeposition step, and the pH of the electrodeposition solution in this case is preferably 4 or more and more preferably 5 to 6. The pH of the electrodeposition solution during (in the middle of) the electrodeposition step is preferably 4 to 9 and more preferably 6 to 8. The pH of the prepared electrodeposition solution may be measured by using, for example, a pH meter or a pH-test paper; however, the pH is preferably calculated from, for example, the types of the raw materials blended in the electrodeposition solution and the amounts thereof used, and is preferably adjusted by, for example, the types of the raw materials blended in the electrodeposition solution and the amounts thereof used.

<<Acid>>

The electrodeposition solution is preferably prepared by using an acid.

Although the acid is not particularly limited, from the viewpoints such as that $^{226}$Ra ions can be more efficiently electrodeposited on a substrate, the acid preferably has no chelating effect on the $^{226}$Ra ions.

One acid may be used alone, or two or more acids may be used.

Examples of the acid include inorganic acids and carboxylic acids having 2 to 6 carbon atoms. Examples of the inorganic acids include nitric acid, hydrochloric acid, and boric acid. Examples of the carboxylic acids having 2 to 6 carbon atoms include acetic acid, succinic acid, and benzoic acid.

From the viewpoint of, for example, improving the yield of $^{225}$Ac, the acid is preferably a monovalent or divalent acid.

The acid concentration in the electrodeposition solution may be appropriately selected according to the type of the acid used, and the acid is preferably used such that the electrodeposition solution is acidic at the start of the electrodeposition step. The specific concentration is preferably 0.005 to 0.2 mol/L and more preferably 0.005 to 0.05 mol/L. When the acid concentration is within this range, $^{226}$Ra ions can be more efficiently electrodeposited on a substrate.

For the same reason, especially when hydrochloric acid is used as the acid, the concentration thereof in the electrodeposition solution is preferably 0.04 mol/L or less, and more preferably 0.005 to 0.035 mol/L; and when nitric acid is used as the acid, the concentration thereof in the electrodeposition solution is preferably 0.2 mol/L or less and more preferably 0.005 to 0.1 mol/L.

When acetic acid is used as the acid, the concentration thereof in the electrodeposition solution is preferably 0.2 mol/L or less and more preferably 0.05 to 0.1 mol/L.

The amount of the acid used relative to 0.02 mol/L of $^{226}$Ra ions is preferably 0.5 mol/L or less and more preferably 0.001 to 0.4 mol/L.

According to the present production method, even when such an amount of the acid is used, $^{226}$Ra ions can be more efficiently electrodeposited on a substrate.

<<pH Buffer>>

The pH buffer is not particularly limited as long as rapid changes in pH can be prevented; however, a pH buffer that can maintain the pH of the electrodeposition solution to about 4 to 9 and preferably about 6 to 8 during (in the middle of) the electrodeposition step is preferably used.

Although the pH buffer is not particularly limited, a pH buffer solution is usually used.

One pH buffer or two or more pH buffers may be used in the electrodeposition solution.

Examples of the pH buffer include ammonium chloride; carbonate salts such as ammonium carbonate, sodium carbonate, potassium carbonate, calcium carbonate, and magnesium carbonate; hydrogen carbonate salts such as ammonium hydrogen carbonate, sodium hydrogen carbonate, and potassium hydrogen carbonate; acetate salts such as ammonium acetate, sodium acetate, and potassium acetate; succinate salts such as monosodium succinate, disodium succinate, monopotassium succinate, dipotassium succinate, monoammonium succinate, and diammonium succinate, and benzoate salts such as sodium benzoate, potassium benzoate, and ammonium benzoate. Among these, from the viewpoints such as that the pH of the electrodeposition solution can be easily maintained within the above range during the electrodeposition step and that $^{226}$Ra ions can be more efficiently electrodeposited on a substrate, carboxylate salts are preferable, mono- or divalent carboxylate salts are more preferable, acetate salts are yet more preferable, and ammonium acetate is still more preferable.

The pH buffer concentration in the electrodeposition solution may be appropriately selected according to the type of the pH buffer used; however, the pH buffer is preferably used so that the pH of the electrodeposition solution is within the above range during the electrodeposition step. The specific concentration is preferably 0.2 to 1.0 mol/L and more preferably 0.2 to 0.8 mol/L. When the pH buffer concentration is within this range, $^{226}$Ra ions can be more efficiently electrodeposited on a substrate.

In addition, from the viewpoints such as that $^{226}$Ra ions can be more efficiently electrodeposited on a substrate, the ratio of using the acid and the pH buffer in the electrodeposition solution is preferably such that the electrodeposition solution is acidic at the start of the electrodeposition step.

From the viewpoints such as that $^{226}$Ra ions can be more efficiently electrodeposited on a substrate, the amount of the pH buffer used relative to 0.02 mol/L of $^{226}$Ra ions is preferably 0.1 to 11.0 mol/L and more preferably 0.2 to 11.0 mol/L.

<<$^{226}$Ra Ions>>

$^{226}$Ra ions are not particularly limited as long as $^{226}$Ra exists as ions, and, typically, a $^{226}$Ra salt or a solution containing this salt is used.

The $^{226}$Ra salt depends on the types of the acid and the alkaline solution used in, for example, purification described below, and specific examples thereof include nitrate salts, chloride salts, hydroxide salts, carboxylate salts, ammonium salts, and carbonate salts of $^{226}$Ra. Although any of these salts can be used, since the electrodeposition solution is preferably acidic at the start of the electrodeposition step, nitrate salts, chloride salts, and carboxylate salts are preferable from this viewpoint.

Since the $^{226}$Ra ions contained in the electrodeposition solution can be efficiently electrodeposited on a substrate by the present production method, the amount of $^{226}$Ra ions in the electrodeposition solution may be appropriately selected according to the desired amount of $^{226}$Ra to be electrodeposited. The desired amount of $^{226}$Ra to be electrodeposited may be determined by considering, for example, the radiation doze permissible for the facility for producing $^{225}$Ac by using the obtained $^{226}$Ra target.

The amount of $^{226}$Ra ions in the electrodeposition solution is, for example, preferably 50 to 150 mg and more preferably 50 to 100 mg if the desired amount of $^{226}$Ra to be electrodeposited is 50 mg.

Examples of the $^{226}$Ra ions that can be used include commercially available $^{226}$Ra or purified forms thereof, $^{226}$Ra ions obtained by purifying a $^{226}$Ra salt-containing solution obtained by dissolving $^{226}$Ra used as a radiation source in the medical or industrial field, and $^{226}$Ra ions obtained by purifying a $^{226}$Ra salt-containing solution obtained by dissolving a $^{226}$Ra target after production of $^{225}$Ac.

An example of the method for purifying a $^{226}$Ra salt-containing solution is a method that includes an adsorption step (R1) of bringing a $^{226}$Ra-containing solution (a) into contact with a carrier having a function of selectively adsorbing divalent cations (hereinafter this carrier may be referred to as a "carrier (i)") under an alkaline condition so as to cause $^{226}$Ra ions to adsorb onto the carrier (i), and an elution step (R2) of causing the $^{226}$Ra ions to elute from the carrier (i) under an acidic condition. Performing this purification can concentrate $^{226}$Ra ions and reduce impurities, and thus $^{226}$Ra ions can be more efficiently electrodeposited on a substrate.

The carrier (i) is not particularly limited as long as the carrier forms a complex with metal ions under an alkaline condition and can elute metal ions under an acidic condition, and the examples thereof include those which have a divalent cation exchange group. Specific examples of the divalent cation exchange group include an iminodiacetic acid group, a polyamine group, and a methylglycan group, and the divalent cation exchange group is preferably an iminodiacetic acid group. The carrier that has a divalent cation exchange group is not particularly limited as long as the divalent cation exchange group is retained on a solid-phase carrier such as a resin. A more preferable example is a styrene divinylbenzene copolymer retaining an iminodiacetic acid group. Examples of the commercially available products of the resin having an iminodiacetic acid group include "Chelex" series produced by Bio-Rad Laboratories, Inc., "DIAION" series produced by Mitsubishi Chemical Corporation, and "Amberlite" series produced by The Dow Chemical Company, and a more specific example is "Chelex 100" produced by Bio-Rad Laboratories, Inc. (particle diameter: 50 to 100 mesh, ion form: Na form, Fe form).

The carrier (i) may be packed in a tube and used. The tube is not particularly limited as long as it can be packed the carrier (i) and has flexibility, and is preferably a flexible tube made from rubber or resin, for example, and is more preferably a medical tube.

When such a tube is used, the length can be increased compared to typical glass columns, in other words, the theoretical plate number can be increased; thus, the $^{226}$Ra ion adsorption efficiency can be increased. Moreover, the carrier (i) through which a radioactive substance ($^{226}$Ra-containing solution) has been passed can be kept packed in the tube and can be discarded easily without radioactively contaminating other equipment and devices, for example.

A specific example of the elution step (R2) is a method that involves passing an inorganic acid through the carrier (i) to thereby elute $^{226}$Ra ions adsorbed on the carrier (i).

The inorganic acid may be any inorganic acid that can dissolve and ionize the $^{226}$Ra component adsorbed on the carrier (i), and examples thereof include hydrochloric acid and nitric acid.

Note that, from the viewpoints such as that $^{226}$Ra ions can be efficiently eluted from the carrier and that inorganic acid-derived anions can be efficiently removed in a later step, the inorganic acid concentration is preferably 0.1 to 12 mol/L, more preferably 0.3 to 5 mol/L, yet more preferably 0.5 to 2 mol/L, and particularly preferably 0.7 to 1.5 mol/L.

A step of washing the carrier (i) may be included between the step (R1) and the step (R2). Specifically, water is passed through the carrier (i). The proportion of the impurities can be further reduced by this washing.

The $^{226}$Ra ion-containing solution eluted in the elution step (R2) is preferably subjected to an anion exchange step (R3) of passing the solution through an anion exchange resin.

When anions (for example, chloride ions) derived from the inorganic acid (for example, hydrochloric acid) used in the elution step (R2) remains in the solution, the $^{226}$Ra ion electrodeposition rate in the electrodeposition step may be affected. Thus, the $^{226}$Ra ion-containing solution eluted in the elution step (R2) is preferably treated in the anion exchange step (R3) since the anions derived from the inorganic acid can be exchanged to hydroxide ions and decreased, and the $^{226}$Ra ion electrodeposition efficiency in the electrodeposition step can be improved.

The anion exchange resin is not particularly limited as long as the anions (for example, chloride ions) derived from the inorganic acid can be exchanged to hydroxide ions, and is preferably a strongly basic anion exchange resin and more preferably a resin having a quaternary ammonium salt. Examples of the commercially available products of such an anion exchange resin include "MONOSPHERE" series produced by The Dow Chemical Company, and "AG" series produced by Bio-Rad Laboratories, Inc., and a more specific example is "MONOSPHERE 550A" (particle diameter: 590±50 mesh, ion form: OH form).

The anion exchange resin may be packed in a tube and used, as with the carrier (i). Examples of the tube that can be used are the same as those for the above tube for packing the carrier (i).

<<Other Components>>

The electrodeposition solution may contain, if necessary, components that have been used in, for example, electroplating as long as the effects of the present invention are not impaired. One other component or two or more other components may be used.

The electrodeposition solution preferably contains water, and the amount of water in the electrodeposition solution is, for example, preferably 15 to 50 mL when the desired amount of $^{226}$Ra to be electrodeposited is 50 mg.

It is also possible to use an alkali as appropriate from the viewpoint of adjusting the pH of the electrodeposition solution, and examples of the alkali include sodium hydroxide, potassium hydroxide, and ammonia.

A specific example of the electrodeposition solution is an electrodeposition solution that satisfies (a) to (d) below.

(a) contains $^{226}$Ra ions and a pH buffer.

(b) substantially free of alcohols.

(c) contains one acid or two or more acids, and these acids are monovalent or divalent acids.

(d) contains carboxylate ions and preferably acetate ions.

Another specific example of the electrodeposition solution is an electrodeposition solution that satisfies (a), (b), (e), and (f) below.

(a) contains $^{226}$Ra ions and a pH buffer.

(b) substantially free of alcohols.

(e) contains one acid or two or more acids.

(f) contains, as a pH buffer, a carboxylate salt, preferably a monocarboxylate or dicarboxylate salt, and more preferably an acetate salt.

<Electrodeposition Step>

The electrodeposition step is not particularly limited as long as $^{226}$Ra metal or a salt thereof can be electrodeposited on a substrate, and may be the same step as an existing electroplating, for example, a method that involves inserting an anode and a cathode into the electrodeposition solution and applying electrical current between these electrodes.

The anode is not particularly limited, and, for example, a platinum electrode can be used. Substrates described below may be used as the cathode, for example.

<<Substrate>>

The substrate on which the $^{226}$Ra-containing substance is to be electrodeposited is not particularly limited as long as the substrate has electrical conductivity; however, since the target to be obtained is preferably irradiated with particles such as protons or γ ray by using an accelerator such as a cyclotron or a linear accelerator, the substrate is preferably the one that is suitable for irradiation with such particles, and specifically preferably a metal substrate.

Examples of the metal used in the substrate include aluminum, copper, titanium, silver, gold, iron, nickel, niobium, and alloys containing these metals (for example, phosphor bronze, brass, nickel silver, beryllium copper, Corson alloy, and stainless steel).

Alternatively, a substrate obtained by plating a conductive support with any of these metals may be used as the substrate.

From the viewpoints of, for example, reducing adverse effects on, for example, facility used in irradiation with charged particles, photons, or neutrons, and suppressing contamination of a substrate-derived metal during production of a radioactive isotope (RI) and contamination of a substrate-derived metal during production of $^{226}$Ra ions from the target after production of the RI, a gold plate or a gold-plated plate is preferably used as the substrate. Furthermore, by using a gold plate or a gold-plated plate as the substrate, $^{226}$Ra ions can be more efficiently electrodeposited on the substrate.

The shape of the substrate is not particularly limited, and may be appropriately selected according to the desired shape of the target; however, the substrate is preferably plate-shaped.

<<Electrodeposition Conditions>>

The power supply used for applying electrical current is not particularly limited, and a DC power supply, an AC power supply, a pulse power supply, or a PR pulse power supply, for example, can be used. Among these, a pulse power supply or a PR pulse power supply is preferably used since such a power supply can easily evenly electrodeposit $^{226}$Ra ion-containing substance by improving $^{226}$Ra ion diffusion, can suppress generation of heat, and can perform electrodeposition by a small power supply, for example.

When a pulse power supply or a PR pulse power supply is used, the ON current and the OFF current are preferably decreased, and the voltage during electrodeposition is preferably decreased. In this case, for example, the value of the ON current is preferably 0.1 to 0.3 A, and the value of the OFF current is preferably 0.0 to 0.2 A.

From the viewpoint of, for example, ease of separating bubbles generated during electrodeposition from the electrode, the ON time and the OFF time are preferably both short. In this case, for example, the ON time is preferably 10 to 90 msec, and the OFF time is preferably 10 to 90 msec.

The electrodeposition time depends on the applied electrical current, and may be appropriately adjusted according to the desired amount of $^{226}$Ra to be electrodeposited on a substrate; however, when a pulse power supply or a PR pulse power supply is used, the electrodeposition time is preferably 30 minutes or longer and more preferably 1 to 24 hours from the viewpoints such as that a target that can produce a desired amount of $^{225}$Ac can be easily obtained.

The temperature (temperature of the electrodeposition solution) during the electrodeposition step is not particularly limited, and, for example, is about 10 to 80° C.

[Production Method of $^{225}$Ac]

A production method of $^{225}$Ac according to one embodiment of the present invention includes an irradiating step of irradiating a $^{226}$Ra target, which has been produced by the present production method, with at least one type of particles selected from charged particles, photons, and neutrons.

The particles are preferably protons, deuterons, a particles, or γ ray, and more preferably protons.

A specific example of the irradiating step is a step of accelerating particles, such as protons or γ ray, by using an accelerator, such as a cyclotron or a linear accelerator and preferably a cyclotron, and irradiating the $^{226}$Ra target, which has been produced by the present production method, with the accelerated particles.

Irradiating the $^{226}$Ra target with particles generates $^{225}$Ac via, in some cases, disintegration, for example. Purified $^{225}$Ac can be obtained by separating and purifying $^{225}$Ac from the target that contains $^{225}$Ac generated as such.

The method for separating and purifying $^{225}$Ac is not particularly limited, and a known method can be employed; however, one example is a method that involves dissolving the $^{225}$Ac-containing target by using, for example, an acid, adding an alkali to the obtained solution to deposit a $^{225}$Ac-containing salt, and separating and purifying the salt.

EXAMPLES

The present invention will now be further described through test examples, but the present invention is not limited by these examples.

Note that the test that uses $^{226}$Ra cannot be easily conducted due to the issues associated with, for example, radioactivity; thus, in some of the tests described below, barium, which is considered to yield the same results as $^{226}$Ra, is used in testing. Radium is an element belonging to the alkaline earth metal, and has properties similar to barium, which is also an alkaline earth metal and has the closest mass to barium. Moreover, in the past, in extracting radium from pitch blend after uranium extraction, the coprecipitation action with barium sulfate was utilized; thus, it is known that radium and barium are very similar in their properties.

Test Example 1

In a 0.05 mol/L aqueous hydrochloric acid solution, barium chloride dihydrate was dissolved to prepare an aqueous Ba hydrochloric acid solution in a liquid amount of 2 mL and a Ba mass of 60 mg. An electrodeposition solution was prepared by mixing 14.4 mL of a 0.35 mol/L aqueous ammonium acetate solution, 1.6 mL of a 0.1 mol/L aqueous nitric acid solution, and 2 mL of the prepared aqueous Ba hydrochloric acid solution. The pH of the electrodeposition solution measured with a pH-test paper was 5 to 6. In preparing the aqueous solutions, ultrapure water was used. The concentrations of the respective components in the electrodeposition solution and the liquid amount of the electrodeposition solution are shown in Table 1.

The prepared electrodeposition solution was placed in an electrodeposition vessel, a platinum electrode was inserted thereto as the anode, and a ϕ10 mm gold plate (thickness: 0.2 mm) was inserted thereto as the cathode (substrate). Next, pulse electrical current [a cycle of applying 0.1 A electrical current for 10 msec and retaining the current value of 0.0 A for 10 msec was continuously repeated (ON current: 0.1 A, ON time: 10 msec, OFF current: 0.0 A, OFF time: 10 msec)] was applied to these electrodes by using, as the electrodeposition power supply, MPS-II-012010S10 (produced by Chiyoda Electronics Co. Ltd.) for 3.5 hours to electrodeposit Ba (Ba salt) on the gold plate.

After applying the pulse electrical current for 3.5 hours, the gold plate was taken out and washed with ultrapure water, and the washed gold plate was dried at 100° C. for 1 hour.

The increase in mass after electrodeposition was calculated from the change in mass between the gold plate after drying and the gold plate before electrodeposition. Note that the "Average increase in mass after electrodeposition" described in the tables below is the average of the increase in mass after the electrodeposition after performing the same test multiple times. The results are shown in Table 1.

Test Examples 2 to 20

The average increase in mass after electrodeposition was calculated as in Test Example 1 except that the types and amounts (concentrations) of the respective components in the electrodeposition solution, the liquid amount, the substrate, and the electrodeposition time were changed as shown in Tables 1 and 2. The results are shown in Tables 1 and 2. Note that the pH of the electrodeposition solutions obtained in these test examples are all considered to fall within the range of 5 to 7.

TABLE 1

| | Electrodeposition solution | | | | | | | | |
|---|---|---|---|---|---|---|---|---|---|
| | Ba | Ammonium acetate | Nitric acid | Hydrochloric acid | Liquid | Substrate | | Electro-deposition | Average increase in mass after |
| Test name | mass (mg) | concentration (mol/L) | concentration (mol/L) | concentration (mol/L) | amount (mL) | Type | Diameter (mm) | time (hour) | electrodeposition (mg) |
| Test Example 1 | 60 | 0.280 | 0.009 | 0.006 | 18 | Gold plate | ϕ10 | 3.5 | 21 |
| Test Example 2 | 60 | 0.400 | 0.009 | 0.006 | 18 | Gold plate | ϕ10 | 3.5 | 43.8 |
| Test Example 3 | 60 | 0.400 | 0.089 | 0.006 | 18 | Gold plate | ϕ10 | 3.5 | 45 |
| Test Example 4 | 60 | 0.560 | 0.009 | 0.006 | 18 | Gold plate | ϕ10 | 3.5 | 29 |
| Test Example 5 | 60 | 0.800 | 0.009 | 0.006 | 18 | Gold plate | ϕ10 | 3.5 | 23 |
| Test Example 6 | 60 | 0.444 | — | 0.006 | 18 | Gold plate | ϕ10 | 3.5 | 41 |
| Test Example 7 | 60 | 0.400 | — | 0.011 | 18 | Gold plate | ϕ10 | 3.5 | 44 |
| Test Example 8 | 60 | 0.400 | — | 0.017 | 18 | Gold plate | ϕ10 | 3.5 | 19 |
| Test Example 9 | 1.8 | 0.400 | 0.009 | 0.006 | 18 | Gold plate | ϕ10 | 3.5 | 2 |
| Test Example 10 | 60 | 0.280 | 0.009 | 0.006 | 45 | Gold plate | ϕ20 | 3.5 | 40 |
| Test Example 11 | 60 | 0.400 | 0.009 | 0.006 | 45 | Gold plate | ϕ20 | 3.5 | 43.4 |
| Test Example 12 | 60 | 0.560 | 0.009 | 0.006 | 45 | Gold plate | ϕ20 | 3.5 | 45 |
| Test Example 13 | 60 | 0.800 | 0.009 | 0.006 | 45 | Gold plate | ϕ20 | 3.5 | 42 |
| Test Example 14 | 4.5 | 0.400 | 0.009 | 0.006 | 45 | Gold plate | ϕ20 | 3.5 | 4 |
| Test Example 15 | 225 | 0.400 | 0.009 | 0.006 | 45 | Gold plate | ϕ20 | 3.5 | 12 |
| Test Example 16 | 315 | 0.400 | 0.009 | 0.006 | 45 | Gold plate | ϕ20 | 3.5 | 8 |

TABLE 1-continued

| Test name | Electrodeposition solution: Ba mass (mg) | Ammonium acetate concentration (mol/L) | Nitric acid concentration (mol/L) | Hydrochloric acid concentration (mol/L) | Liquid amount (mL) | Substrate: Type | Substrate: Diameter (mm) | Electro-deposition time (hour) | Average increase in mass after electrodeposition (mg) |
|---|---|---|---|---|---|---|---|---|---|
| Test Example 17 | 450 | 0.400 | 0.009 | 0.006 | 45 | Gold plate | ϕ20 | 3.5 | 5 |

TABLE 2

| Test name | Electrodeposition solution: Ba mass (mg) | Ammonium acetate concentration (mol/L) | Acetic acid concentration (mol/L) | Liquid amount (mL) | Electrodeposition time (hour) | Average increase in mass after electrodeposition (mg) |
|---|---|---|---|---|---|---|
| Test Example 18 | 34 | 0.45 | 0.05 | 25 | 3 | 35.4 |
| Test Example 19 | 34 | 0.45 | 0.07 | 25 | 3 | 28.1 |
| Test Example 20 | 34 | 0.45 | 0.1 | 25 | 3 | 24.8 |

Test Examples 21 to 25

Electrodeposition solutions were prepared as in Test Example 1 except that the amounts (concentrations) of the respective components in the electrodeposition solution and the liquid amount were changed as shown in Table 3. Note that the pH of the electrodeposition solutions obtained in these test examples are all considered to fall within the range of 5 to 6.

The average increase in mass after electrodeposition was calculated as in Test Example 1 except that the obtained electrodeposition solutions were used, a SUS plate (24×24 mm, thickness: 2 mm) was used as the substrate, and the conditions of the pulse electrical current and the electrodeposition time were changed as shown in Table 3. The results are shown in Table 3.

TABLE 3

| Test name | Electrodeposition solution: Ba mass (mg) | Ammonium acetate concentration (mol/L) | Nitric acid concentration (mol/L) | Hydrochloric acid concentration (mol/L) | Liquid amount (mL) | Electrodeposition step: ON current/OFF current (A) | ON time/OFF time (msec) | Electro-deposition time (min) | Average increase in mass after electro-deposition (mg) |
|---|---|---|---|---|---|---|---|---|---|
| Test Example 21 | 40 | 0.28 | 0.0089 | 0.0056 | 18 | 0.2/0.1 | 10/90 | 20 | 6 |
| Test Example 22 | 40 | 0.28 | 0.0089 | 0.0056 | 18 | 0.2/0.1 | 10/90 | 40 | 20 |
| Test Example 23 | 40 | 0.28 | 0.0089 | 0.0056 | 18 | 0.2/0.1 | 90/10 | 40 | 21 |
| Test Example 24 | 40 | 0.28 | 0.0089 | 0.0056 | 18 | 0.2/0.1 | 10/90 | 80 | 24 |
| Test Example 25 | 40 | 0.28 | 0.0089 | 0.0056 | 18 | 0.2/0.1 | 10/90 | 160 | 26 |

Test Example 26

The average increase in mass after electrodeposition was calculated as in Test Example 1 except that the types and amounts (concentrations) of the respective components in the electrodeposition solution were changed as shown in Table 4 and a ϕ20 mm gold plate (thickness: 0.2 mm) was used as the substrate. The results are shown in Table 4. The pH of the electrodeposition solution obtained in Test Example 26 measured with a pH-test paper was 6.

TABLE 4

| | Electrodeposition solution | | | | | | | Average increase in mass |
|---|---|---|---|---|---|---|---|---|
| Test name | Ba mass (mg) | Ammonium acetate concentration (mol/L) | Nitric acid concentration (mol/L) | Hydrochloric acid concentration (mol/L) | Sodium carbonate concentration (mol/L) | Liquid amount (mL) | Electro-deposition time (hour) | after electrode position (mg) |
| Test Example 26 | 60 | 0.39 | 0.009 | 0.006 | 0.0111 | 18 | 6 | 60 |

Test Example 27

An electrodeposition solution was prepared as in Test Example 1 except that the amounts (concentrations) of the respective components in the electrodeposition solution were changed as shown in Table 5.

The average increase in mass after electrodeposition was measured as in Test Example 1 except that the obtained electrodeposition solution was used and that 0.1 A constant current was applied for 210 minutes by using, as an electrodeposition power supply, MPS-II-012010S10 (produced by Chiyoda Electronics Co. Ltd.). The results are shown in Table 5. The pH of the electrodeposition solution obtained in Test Example 27 is considered to be 6.

TABLE 5

| | Electrodeposition solution | | | | | | Average |
|---|---|---|---|---|---|---|---|
| Test name | Ba mass (mg) | Ammonium acetate concentration (mol/L) | Nitric acid concentration (mol/L) | Hydrochloric acid concentration (mol/L) | Liquid amount (mL) | Electro-deposition time (min) | increase in mass after electrodeposition (mg) |
| Test Example 27 | 60 | 0.40 | 0.009 | 0.006 | 18 | 210 | 25 |

Test Example 28

In a 0.05 mol/L aqueous hydrochloric acid solution, barium chloride dihydrate was dissolved to prepare an aqueous Ba hydrochloric acid solution in a liquid amount of 1.1 mL and a Ba mass of 34 mg. Then 25 mL of an electrodeposition solution was prepared by mixing 12.5 mL of a 1 mol/L aqueous acetic acid solution, 11.4 mL of a 1.1 mol/L ammonia water, and 1.1 mL of the prepared aqueous Ba hydrochloric acid solution. In preparing the aqueous solutions, ultrapure water was used.

The increase in mass after electrodeposition was calculated as in Test Example 1 except that the obtained electrodeposition solution was used, that a ϕ20 mm gold plate (thickness: 0.2 mm) was used as the substrate, and that the electrodeposition time was changed to 3 hours. The increase in mass after electrodeposition was 31.3 mg.

Test Example 29

In a 0.05 mol/L aqueous hydrochloric acid solution, barium chloride dihydrate was dissolved to prepare an aqueous Ba hydrochloric acid solution in a liquid amount of 1.1 mL and a Ba mass of 34 mg. Then 25 mL of an electrodeposition solution was prepared by mixing 15.625 mL of a 0.4 mol/L aqueous succinic acid solution, 8.275 mL of a 1.5 mol/L ammonia water, and 1.1 mL of the prepared aqueous Ba hydrochloric acid solution. In preparing the aqueous solutions, ultrapure water was used.

The increase in mass after electrodeposition was calculated as in Test Example 1 except that the obtained electrodeposition solution was used, that a ϕ20 mm gold plate (thickness: 0.2 mm) was used as the substrate, and that the electrodeposition time was changed to 3 hours. The increase in mass after electrodeposition was 18.4 mg.

Test Examples 30 to 32

The $^{226}Ra$ target (size: conical shape with Φ10 mm and a thickness of 5 mm, $^{226}Ra$ mass: 0.4 to 0.6 mg) which had been irradiated with protons was dissolved in 3 to 5 mL of 1 mol/L hydrochloric acid to recover a $^{226}Ra$-containing solution (a-1).

Next, Chelex 100 (produced by Bio-Rad Laboratories, Inc., particle diameter: 50-100 mesh, ion form: Na form, amount used: 3 mL) converted into a $NH_4^+$ form was packed in a medical tube (EXTENSION TUBE produced by HAKKO CO., LTD., 3.2×4.4×500 mm (4 mL), MS-FL) having an inner diameter of 3.2 mm, an outer diameter of 4.4 mm, and a length of 50 cm, 50 to 80 mL of the obtained $^{226}$Ra-containing solution (a-1) (pH>9) was passed through the tube at a flow rate of 1 to 2 mL/min, and the eluate was discarded. Next, 10 mL of water was passed through Chelex 100 at a flow rate of 1 to 2 mL/min, and the eluate was also discarded.

Next, MONOSPHERE 550A (produced by The Dow Chemical Company, particle diameter: 590±50 mesh, ion form: OH form, amount used: 20 mL) was sequentially washed with hydrochloric acid, water, sodium hydroxide, and water, packed in a medical tube (EXTENSION TUBE produced by HAKKO CO., LTD., 3.2×4.4×500 mm (4 mL), MS-FL) having an inner diameter of 3.2 mm, an outer diameter of 4.4 mm, and a length of 200 cm, and connected to the tube packed with Chelex 100 after 10 mL of water was passed therethrough as indicated above.

From the Chelex 100-side of the thus connected tube, 10 mL of 1.0 mol/L hydrochloric acid was passed at a flow rate of 1 mL/min, and then 8 cc of water was passed in a similar manner to obtain a Ra hydroxide solution. The obtained solution was evaporated to dryness, and the dried product was dissolved in 1 mL of 0.1 mol/L hydrochloric acid. To this solution, 2 mL of a 0.5 mol/L aqueous ammonium acetate solution was mixed to prepare an electrodeposition solution. The pH of the obtained electrodeposition solution is considered to be about 5.

The $^{226}$Ra content in the obtained electrodeposition solution was measured by radioactivity measurement with a germanium semiconductor detector produced by EURISYS MESURES. The results are shown in Table 6.

The $^{226}$Ra-containing substance was electrodeposited on a substrate by performing the electrodeposition step as in Test Example 1 except that the prepared electrodeposition solution was used, that a ϕ10 mm gold-plated silver plate (a conical shape having a thickness of 5 mm) was used as the substrate, and that the electrodeposition time was changed to 3 hours.

Since it is not easy to directly measure the $^{226}$Ra content in the substrate after the electrodeposition, the $^{226}$Ra content in the electrodeposition solution after removing the substrate applying the pulse current for 3 hours was measured by radioactivity measurement with a germanium semiconductor detector produced by EURISYS MESURES, and the difference in $^{226}$Ra content in the electrodeposition solution between before and after the electrodeposition was assumed to be the $^{226}$Ra content (amount of electrodeposited Ra) electrodeposited on the substrate. The results are shown in Table 6.

Note that Test Examples 30 to 32 involve the same testing except that a different target was used as the $^{226}$Ra target that had been irradiated with protons.

TABLE 6

| | Electrodeposition solution | | | | | | | |
|---|---|---|---|---|---|---|---|---|
| | Amount | Ammonium acetate | Hydrochloric acid | Liquid | Substrate | | Electro-deposition | Amount of Ra |
| Test name | of Ra (uCi) | concentration (mol/L) | concentration (mol/L) | amount (mL) | Type | Diameter (mm) | time (hour) | electrodeposited (uCi) |
| Test Example 30 | 562 | 0.33 | 0.03 | 3 | Gold plated | ϕ10 | 3 | 462 |
| Test Example 31 | 552 | 0.33 | 0.03 | 3 | Gold plated | ϕ10 | 3 | 477 |
| Test Example 32 | 440 | 0.33 | 0.03 | 3 | Gold plated | ϕ10 | 3 | 330 |

The invention claimed is:

1. A production method of a $^{226}$Ra target, comprising an electrodeposition step of electrodepositing a $^{226}$Ra-containing substance on a substrate by using an electrodeposition solution that contains $^{226}$Ra ions and a pH buffer and that is substantially free of alcohols, wherein a value of an ON current is 0.1 to 0.3 A, and a value of an OFF current is 0.0 to 0.2 A in the electrodeposition step.

2. The production method according to claim 1, wherein an ON time is 10 to 90 msec, and an OFF time is 10 to 90 msec in the electrodeposition step.

3. The production method according to claim 1, wherein the electrodeposition solution further comprises carboxylate ions.

4. The production method according to claim 3, wherein an ON time is 10 to 90 msec, and an OFF time is 10 to 90 msec in the electrodeposition step.

5. The production method according to claim 1, wherein the electrodeposition solution further comprises one acid or two or more acids, and the acids are monovalent or divalent acids.

6. The production method according to claim 1, wherein the electrodeposition solution is acidic at the start of the electrodeposition step.

7. The production method according to claim 1, wherein the electrodeposition solution has a pH of 4 to 9 during the electrodeposition step.

8. The production method according to claim 1, wherein the pH buffer is a monocarboxylate or dicarboxylate salt.

9. The production method according to claim 1, wherein an alcohol or acetone content in the electrodeposition solution is 0.01 mass % or less.

10. The production method according to claim 1, further comprising a purification step of purifying a $^{226}$Ra salt-containing solution to concentrate $^{266}$Ra ions and reduce impurities in the $^{226}$Ra salt-containing solution, wherein the electrodeposition step includes electrodepositing the $^{226}$Ra-containing substance on the substrate by using the electrodeposition solution that contains $^{226}$Ra ions obtained by the purification step.

11. The production method according to claim 10, wherein the purification step includes an adsorption step of bringing the $^{226}Ra$ salt-containing solution into contact with a carrier having a function of selectively adsorbing divalent cations under an alkaline condition so as to cause $^{226}Ra$ ions to adsorb onto the carrier, and an elution step of causing the $^{226}Ra$ ions to elute from the carrier under an acidic condition.

12. The production method according to claim 11, further comprising a step of an anion exchange step of passing a $^{226}Ra$ ion-containing solution eluted in the elution step through an anion exchange resin.

13. A production method of $^{225}Ac$, comprising a step of producing a $^{226}Ra$ target by performing the production method of the $^{226}Ra$ target according to claim 1 and, an irradiating step of irradiating the $^{226}Ra$ target produced by the production method of the $^{226}Ra$ target with at least one selected from charged a particle, a photon, and a neutron.

* * * * *